US005396638A

United States Patent [19]
Kanekura

[11] Patent Number: 5,396,638
[45] Date of Patent: Mar. 7, 1995

[54] DATA JUNCTION AND BRANCHING APPARATUS FOR AN ASYNCHRONOUS DATA TRANSMISSION PATH

[75] Inventor: Hiroshi Kanekura, Yamatokooriyama, Japan

[73] Assignee: Sharp Kabushiki Kaisha, Osaka, Japan

[21] Appl. No.: 800,465

[22] Filed: Dec. 2, 1991

[30] Foreign Application Priority Data

Dec. 21, 1990 [JP] Japan .................. 2-404774

[51] Int. Cl.⁶ ............. G06F 13/00; G06F 15/82; G06F 9/38
[52] U.S. Cl. .................. 395/775; 395/325; 370/60; 370/94.1; 364/232.22; 364/260; 364/231.8; 364/241.9; 364/DIG. 1
[58] Field of Search ............ 395/325, 800, 200, 775, 395/425; 370/60.1, 94.1, 60; 340/825.5, 825.06

[56] References Cited

U.S. PATENT DOCUMENTS

| 4,149,240 | 4/1979 | Misunas et al. .......... 364/200 |
| 4,523,273 | 6/1985 | Adams, III et al. ........ 364/200 |
| 4,918,644 | 4/1990 | Terada et al. ............ 395/325 |
| 5,043,875 | 8/1991 | Hall .................... 364/200 |
| 5,093,919 | 3/1992 | Yoshida et al. .......... 395/800 |
| 5,113,390 | 5/1992 | Hayashi et al. .......... 370/65 |
| 5,115,510 | 5/1992 | Okamoto et al. ......... 395/775 |
| 5,123,090 | 6/1992 | Komatsu et al. ......... 395/200 |
| 5,138,704 | 8/1992 | Takahashi et al. ........ 395/325 |
| 5,170,483 | 12/1992 | Keryvel et al. ......... 395/800 |

OTHER PUBLICATIONS

"An Implementation of Elementary Function in a Data-Driven Processor".
"An Implementation Method of a Large-Scale Storage Mechanism".
"VLSI Architecture of Data-Driven Processor and Its Implementation Method".
"Transfer System of Data-Driven Processor Q—P".

Primary Examiner—Gopal C. Ray

[57] ABSTRACT

A data transmission apparatus having a junction and branching mechanism includes an arbitration control portion and a switching element. The arbitration control portion sets a state of the switching element based on an identifier included in each packet data. When identifiers in the packet data applied from a first input port and a second input port indicate branch destinations different from each other, the data are simultaneously transferred to a first output port and a second output port through the switching element. When both the identifiers in the packet data from the first and second input ports specify the same output port of the first and second output ports, the data is transferred to the specified port in their order of arrival.

9 Claims, 14 Drawing Sheets

| DESTINATION FIELD | INSTRUCTION FIELD | DATA 1 FIELD | DATA 2 FIELD |

DATA JUNCTION AND BRANCHING APPARATUS FOR AN ASYNCHRONOUS DATA TRANSMISSION PATH

CROSS-REFERENCE TO RELATED APPLICATIONS

This application is related to copending application Ser. No. 259,850, filed Oct. 19, 1989 now U.S. Pat. No. 5,133,054, No. 260,068, filed Oct. 20, 1988 now U.S. Pat. No. 4,985,890, No. 323,021, filed Mar. 14, 1989 now U.S. Pat. No. 5,008,880 and No. 497,221, filed Mar. 22, 1990 now U.S. Pat. No. 5,323,387, commonly assigned with the present invention.

BACKGROUND OF THE INVENTION

1. Field of the Invention

The present invention relates generally to data transmission apparatus, and more particularly, to a data junction and branching mechanism for an asynchronous data transmission path.

2. Description of the Background Art

Data processing apparatuses such as data flow type information processors employ asynchronous data transmission paths. In such data processing apparatus, a junction mechanism for merging a plurality of data packets is used for transmitting data packets applied from data transmission paths in a plurality of preceding stages to a data transmission path in one succeeding stage. For transmitting data packets applied from a data transmission path in a preceding stage to data transmission paths in a plurality of succeeding stages, a branching mechanism for sequentially branching the respective data packets. A junction and branching mechanism including a junction mechanism and a branching mechanism is used for transmitting each of a plurality of data packets applied from data transmission paths in a plurality of preceding stages to any of data transmission paths in a plurality of succeeding stages.

FIG. 17 is a block diagram showing a conventional data transmission apparatus for merging a plurality of data packets applied from transmission paths in two preceding stages to a transmission path in one succeeding stage. Such data transmission apparatus is disclosed in Japanese Patent Laying-Open No. 62-265738 and the corresponding U.S. patent application Ser. No. 260,068 now U.S. Pat. No. 4,985,890.

An n-bit packet data applied from an A port is transferred to a data transmission path 170 through data transmission paths 110, 120 and 130. An n-bit packet data applied to a B port is transferred to the data transmission path 170 through data transmission paths 140, 150 and 160. When the packet data from the A port contends with packet data from the B port, the packet data arriving first, is first transferred to the data transmission path 170 by the control of an arbitration control portion 220.

Operation will be described in a case where packet data from the A port arrives prior to packet data from the B port.

Packet data is applied to the data transmission path 110 in response to a transmission signal C110. As a result, a transmission acknowledging signal AK110 enters an inhibited state. When a transmission acknowledging signal AK120 is at an acknowledged state, the packet data is transferred to the data transmission path 120 in response to a transmission signal C120. As a result, the transmission acknowledging signal AK120 enters an inhibited state. When a transmission acknowledging signal AK130 is at an acknowledged state, the packet data is transferred to the data transmission path 130 in response to a transmission signal C130. As a result, the transmission acknowledging signal AK130 enters an inhibited state.

The arbitration control portion 220 renders a transmission acknowledging signal AK171 acknowledged and a transmission acknowledging signal AK172 inhibited in response to the transmission signal C130 and the transmission acknowledging signal AK130 when a transmission acknowledging signal AK170 is at an acknowledged state.

Meanwhile, packet data is applied to the data transmission path 140 in response to a transmission signal C140. As a result, a transmission acknowledging signal AK140 enters an inhibited state. When a transmission acknowledging signal AK150 is at an acknowledged state, the packet data is transferred to the data transmission path 150 in response to a transmission signal C150. As a result, the transmission acknowledging signal AK150 enters an inhibited state. When a transmission acknowledging signal AK160 is at an acknowledged state, the packet data is transferred to the data transmission path 160 in response to a transmission signal C160. As a result, the transmission acknowledging signal AK160 is inhibited.

With the transmission acknowledging signal AK171 acknowledged and the transmission acknowledging signal AK172 inhibited, data transfer from the data transmission path 130 to the data transmission path 170 is acknowledged to cause data transfer from the data transmission path 160 to the data transmission 170 to stand by. After the packet data is transferred from the data transmission path 130 to the data transmission path 170 in response to a transmission signal C171, the transmission acknowledging signal AK172 is acknowledged to transfer the packet data from the data transmission path 160 to the data transmission path 170.

FIG. 18 is a block diagram showing a conventional data transmission apparatus which branches packet data applied from a transmission path in one preceding stage out into transmission paths in two succeeding stages in turn. This data transmission apparatus is disclosed in Japanese Patent Laying-Open No. 62-265740 and the corresponding U.S. patent application Ser. No. 259,850 now U.S. Pat. No. 5,133,051.

Packet data applied to a data transmission path 180 is transferred to either a data transmission path 200 or 210 through a data transmission path 190 and output to a C port or a D port.

Packet data is applied to the data transmission path 180 in response to a transmission signal C180. As a result, a transmission acknowledging signal AK180 is inhibited. When a transmission acknowledging signal AK190 is acknowledged, the packet data is transferred to the data transmission path 190 in response to a transmission signal C190. As a result, the transmission acknowledging signal AK190 is inhibited.

Meanwhile, a branch destination specifying bit BR is previously applied to a comparison and determination logic portion 230. Each packet data includes an identifier. The comparison and determination logic portion 230 compares an identifier included in packet data with the branch destination specifying bit BR and applies the comparison result to a branch control portion 240. The branch control portion 240 activates either of activation signals EA or EB based on the comparison result.

It is assumed, for example, that the activation signal EA is activated. In this case, when a transmission acknowledging signal AK200 is acknowledged, packet data is transferred from the data transmission path 190 to the data transmission path 200 in response to a transmission signal C200. Conversely, it is assumed that the activation signal EB is activated. In this case, when a transmission acknowledging signal AK210 is activated, packet data is transferred from the data transmission path 190 to the data transmission path 210 in response to the transmission signal C200.

As described above, the junction and branching mechanism is structured by combining the data transmission apparatuses shown in FIGS. 17 and 18.

The entire performance of the junction and branching mechanism using the data transmission apparatuses shown in FIGS. 17 and 18 is determined by the maximum flow rate of packet data merged in the data transmission path 170. More specifically, packet data input is allowed up to the maximum flow rate of the data transmission paths 170, 180 and 190 through which the merged packet data flow. Therefore, when packet data are to be simultaneously input to a plurality of data transmission paths on the input side, packet data are not allowed to be input at the maximum flow rate of each data transmission path. As a result, a flow rate of input packet data is inevitably reduced. In a case of junction of packet data from n ports, for example, a flow rate of allowable packet data to be input to each port is reduced to 1/n. In this case, a buffer should be provided.

SUMMARY OF THE INVENTION

An object of the present invention is to hold down the reduction of a data flow rate to the minimum in a data transmission apparatus for transmitting a plurality of pieces of data applied from a plurality of preceding stage portions to any of a plurality of succeeding stage portions.

Another object of the present invention is to improve efficiency of data junction and branching in an asynchronous data transmission path.

A further object of the present invention is to implement a high-speed junction and branching mechanism in an asynchronous data transmission path.

The data transmission apparatus according to the present invention includes a switch for selectively transmitting each data applied from a plurality of preceding stage portions to any of a plurality of succeeding stage portions. Each data includes an identifier for specifying a succeeding stage to which data is to be transmitted. The data transmission apparatus further includes a control circuit for controlling the switch based on an identifier included in each data. The control circuit controls the switch such that data of a plurality of preceding stage portions is simultaneously transmitted to a plurality of succeeding stage portions through the switch when identifiers included in a plurality of data applied from the plurality of preceding stage portions specify succeeding stage portions different from each other.

According to another aspect of the present invention, the plurality of preceding stage portions include first and second preceding stage portions and the plurality of succeeding stage portions include first and second succeeding portions. The control circuit generates a control signal indicative of a first state or a second state. The switch includes first and second input terminals and first, second, third and fourth paths. The first input terminal is connected to the first preceding stage portion, the second input terminal is connected to the second preceding stage portion, the first output terminal is connected to the first succeeding stage portion and the second output terminal is connected to the second succeeding stage portion.

The first path is connected between the first input terminal and the first output terminal and becomes conductive in response to the first state of a control signal and non-conductive in response to the second state of a control signal. The second path is connected between the first input terminal and the second output terminal and becomes non-conductive in response to the first state of a control signal and conductive in response to the second state of a control signal.

The third path is connected between the second input terminal and the first output terminal and becomes non-conductive in response to the first state of a control signal and conductive in response to the second state of a control signal. The fourth path is connected between the second input terminal and the second output terminal and becomes conductive in response to the first state of a control signal and non-conductive in response to the second state of a control signal.

The control circuit sets a control signal to a first state when an identifier in data from the first preceding stage portion specifies the first succeeding state portion and an identifier in data from the second preceding stage portion identifies the second succeeding stage portion and sets a control signal to the second state when an identifier in the data from the first preceding stage portion specifies the second succeeding stage portion and an identifier in the data from the second preceding state portion specifies the first succeeding stage portion. The control circuit sets a control signal to the first or second state and then, to set the same to the second or first state when both of identifiers in the data from the first and the second preceding stage portions specify either the first or the second succeeding stage portion.

According to the data transmission apparatus, when a plurality of data applied from a plurality of preceding stage portions specify destinations different from each other, a plurality of data of the plurality of preceding stage portions are simultaneously transmitted to a plurality of succeeding stage portions through the switch. As a result, a reduction of a data flow rate can be held down to the minimum.

Therefore, efficiency of data junction and branching can be improved to implement a high-speed junction and branching mechanism.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described in detail with reference to the drawings.

Figure 1:
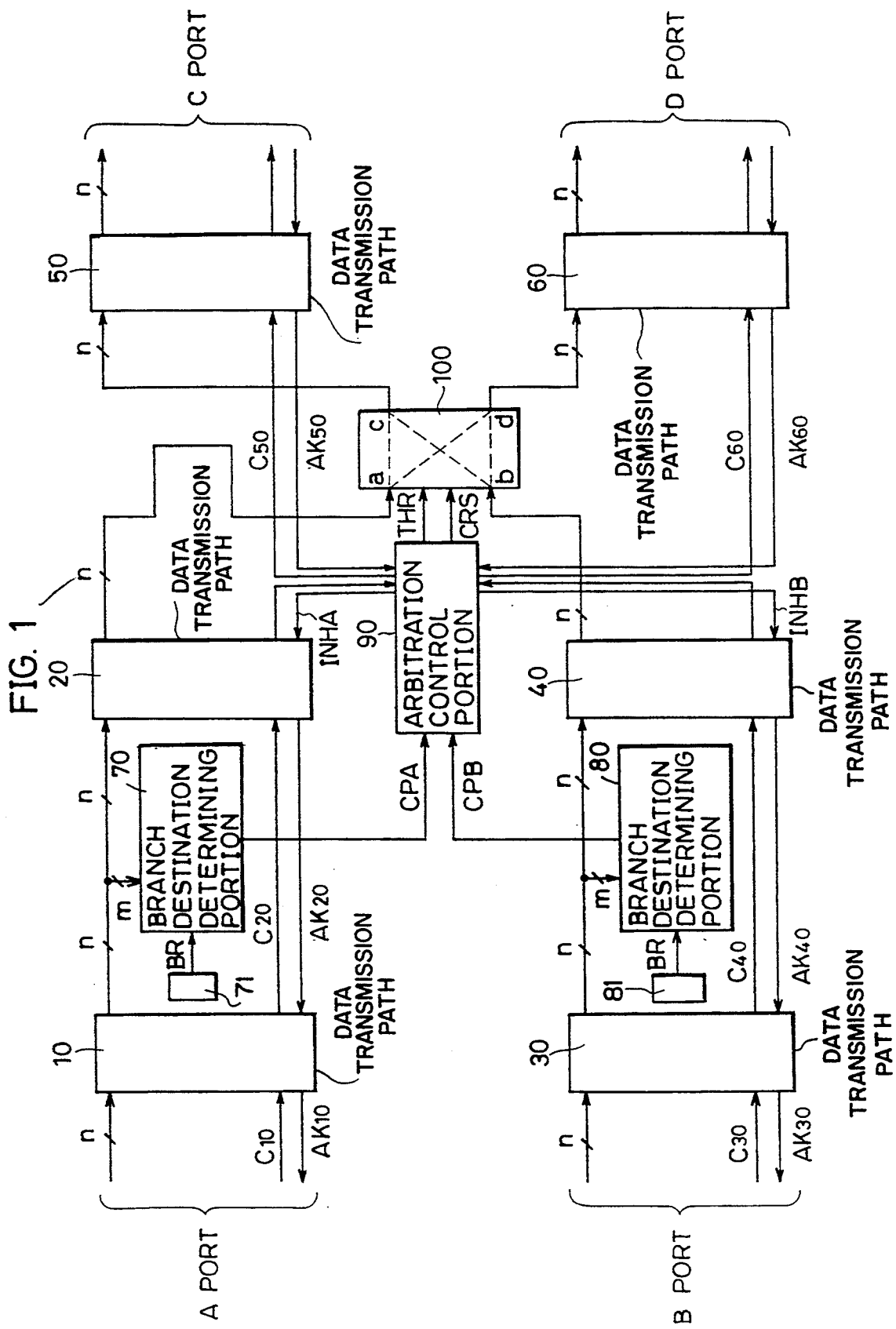
FIG. 1 is a block diagram showing an arrangement of a data transmission apparatus according to one embodiment of the present invention.

FIG. 1 is a block diagram showing an arrangement of a data transmission apparatus according to one embodiment of the present invention. Data transmission paths 10 and 20 constitute a first transmission path at the input side and data transmission paths 30 and 40 constitute a second transmission path at the input side. A data transmission path 50 constitutes a first transmission path at the output side and a data transmission path 60 constitutes a second transmission path at the output side. The input of the data transmission path 10 is referred to as an A port, the input of the data transmission path 30 as a B port, the output of data transmission path 50 as a C port and the output of the data transmission path 60 as a D port.

The first transmission path at the input side is provided with a branch destination specifying bit generating portion 71 and a branch destination determining portion 70 and the second transmission path at the input side is provided with a branch destination specifying bit generating portion 81 and a branch destination determining portion 80. The branch destination specifying bit generating portions 71 and 81 are set in advance to generate a predetermined branch destination specifying bit BR.

An arbitration control portion 90 and a switching element 100 are further provided in this embodiment. The arbitration control portion 90 switches a state of the switching element 100. Packet data applied from the A port is transferred to the switching element 100 through the data transmission paths 10 and 20 and is further transferred to either the transmission path 50 or 60. Packet data applied from the B port is transferred to the switching element 100 through the data transmission paths 30 and 40 and is further transferred to either the data transmission path 50 or 60.

Figure 2:
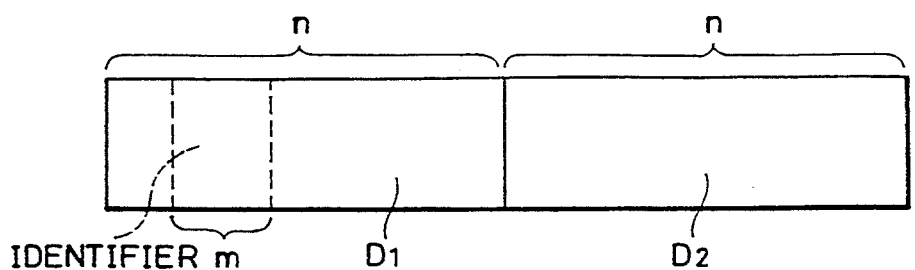
FIG. 2 is a diagram showing an arrangement of a packet data to be transmitted in this embodiment.

FIG. 2 shows an arrangement of packet data to be transferred in this data transmission apparatus.

As shown in FIG. 2, packet data comprises a first word D1 of n bits and a second word D2 of n bits. The first word D1 includes an identifier of m bits. The identifier indicates a branch destination of the packet data. The first word D1 and the second word D2 are transferred in block.

Figure 3:
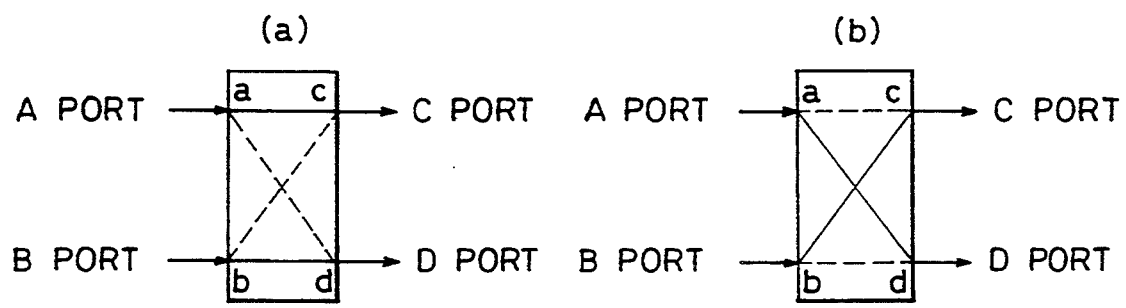
FIG. 3 is a diagram showing a state of a switching element.

Operation of the data transmission apparatus of FIG. 1 will be described with reference to FIG. 3.

Packet data is applied from the A port to the data transmission path 10 in response to a transmission signal C10. As a result, a transmission acknowledging signal AK10 is inhibited. When a transmission acknowledging signal AK20 is acknowledged, the packet data is transferred to the data transmission path 20 in response to a transmission signal C20. As a result, the transmission acknowledging signal AK20 is inhibited. The branch destination determining portion 70 compares identifiers included in the packet data with the branch destination specifying bit BR and applies a determination signal CPA indicative of the comparison result to the arbitration control portion 90.

Meanwhile, packet data is applied from the B port to the data transmission path 30 in response to a transmission signal C30. As a result, a transmission acknowledging signal AK30 is inhibited. When a transmission acknowledging signal AK40 is acknowledged, the packet data is transferred to the data transmission path 40 in response to a transmission signal C40. As a result, the transmission acknowledging signal AK40 is inhibited. The branch destination determining portion 80 compares identifiers included in the packet data with the branch destination specifying bit BR and applies a determination signal CPB indicative of the comparison result to the arbitration control portion 90.

The arbitration control portion 90 generates control signals THR and CRS in response to transmission acknowledging signals AK50 and AK60 and the determination signals CPA and CPB. The state of the switching element 100 is switched in response to the control signals THR and CRS.

The arbitration control portion 90 controls junction and branching in response to the determination signals CPA and CPB. The junction and branching control will be described in the following four cases.

(1) In a case where both packet data from the A port and the B port are output to the C port:

When the packet data from the A port arrives prior to the packet data from the B port, the switching element 100 is set to a "through state" shown in FIG. 3(a). At this time, an inhibition signal INHB applied from the arbitration control portion 90 to the data transmission path 40 is inhibited. As a result, the packet data from the A port is transferred from the data transmission path 20 to the data transmission path 50 in response to a transmission signal C50. As a result, the transmission acknowledging signal AK50 is inhibited. At this time, the packet data from the B port is made to stand by in the data transmission path 40. After the packet data in the data transmission path 50 is output from the C port, the transmission acknowledging signal AK50 is acknowledged. Furthermore, the switching element 100 is switched to "cross state" shown in FIG. 3(b) to acknowledge the inhibition signal INHB. As a result, the packet data from the B port is transferred from the data transmission path 40 to the data transmission path 50.

Conversely, when packet data from the B port arrives prior to the packet data from the A port, the switching element 100 is first set to "cross state" shown in FIG. 3(b) to inhibit an inhibition signal INHA applied from the arbitration control portion 90 to the data transmission path 20. The packet data from the B port is accordingly transferred from the data transmission path 40 to the data transmission path 50 in response to the transmission signal C50 to cause the packet data from the A port to stand by in the data transmission path 20. Thereafter, the switching element 100 is switched to "through state" shown in FIG. 3(a) to acknowledge the transmission acknowledging signal INHA.

(2) In a case where packet data from the A port is output to the C port and packet data from the B port is output to the D port:

The switching element 100 is set to "through state" to acknowledge both of the inhibition signals INHA and INHB. As a result, the packet data from the A port is transferred from the data transmission path 20 to the data transmission path 50 and the packet data from the B port is transferred from the data transmission path 40 to the data transmission path 60 at the same time.

(3) In a case where packet data from the A port is output to the D port and packet data from the B port is output to the C port:

The switching element 100 is set to "cross state" to acknowledge both the inhibition signals INHA and INHB. As a result, packet data from the A port is transferred from the data transmission path 20 to the data transmission. path 60 and at the same time, packet data from the B port is transferred from the data transmission path 40 to the data transmission path 50.

(4) In a case where both of packet data from the A port and the B port are output to the D port:

When packet data from the A port arrives prior to packet data from the B port, the switching element 100 is first set to "cross state" to inhibit the inhibition signal INHB. As a result, the packet data from the A port is transferred from the data transmission path 20 to the data transmission path 60 to cause the packet data from the B port to stand by in the data transmission path 40. Thereafter, the switching element 100 is switched to "through state" to acknowledge the inhibition signal INHB.

Conversely, when the packet data from the B port arrives prior to the packet data from the A port, the switching element 100 is first set to "through state" to inhibit the inhibition signal INHA. As a result, the packet data from the B port is transferred from the data transmission path 40 to the data transmission path 60 to cause the packet data from the A port to stand by in the data transmission path 20. Thereafter, the switching element 100 is switched to "cross state" to acknowledge the inhibition signal INHA.

Figure 4:
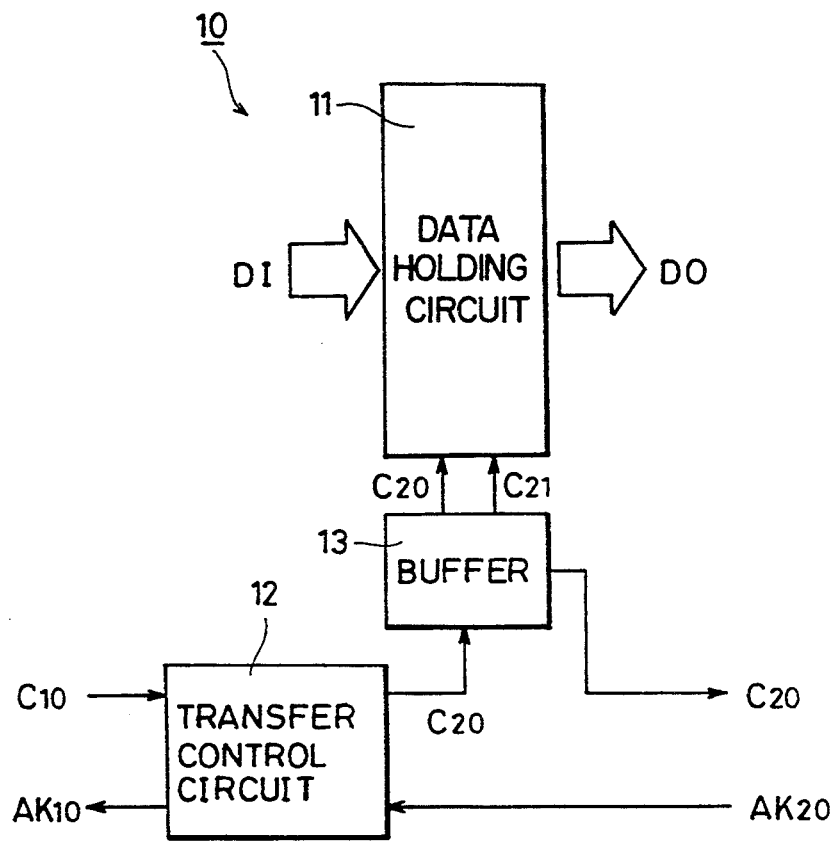
FIG. 4 is a block diagram showing an arrangement of a data transmission path.

FIG. 4 is a block diagram showing an arrangement of the data transmission path 10.

The data transmission path 10 includes a data holding circuit 11, a transfer control circuit 12 and a buffer 13. The data holding circuit 11 holds input data DI in response to a fall of a transmission signal C20 applied from the transfer control circuit 12 through the buffer 13 and outputs the data as output data DO. The buffer 19 serves as a driver for driving the data holding circuit 11.

Arrangements of the other data transmission paths 20, 30, 40, 50 and 60 are the same as those shown in FIG. 4.

Figure 5:
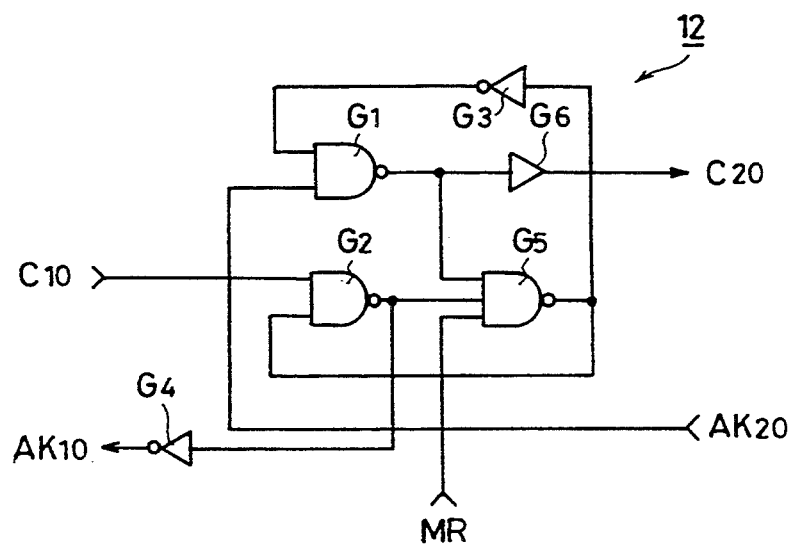
FIG. 5 is a circuit diagram showing an arrangement of a transfer control circuit.
Figure 6:
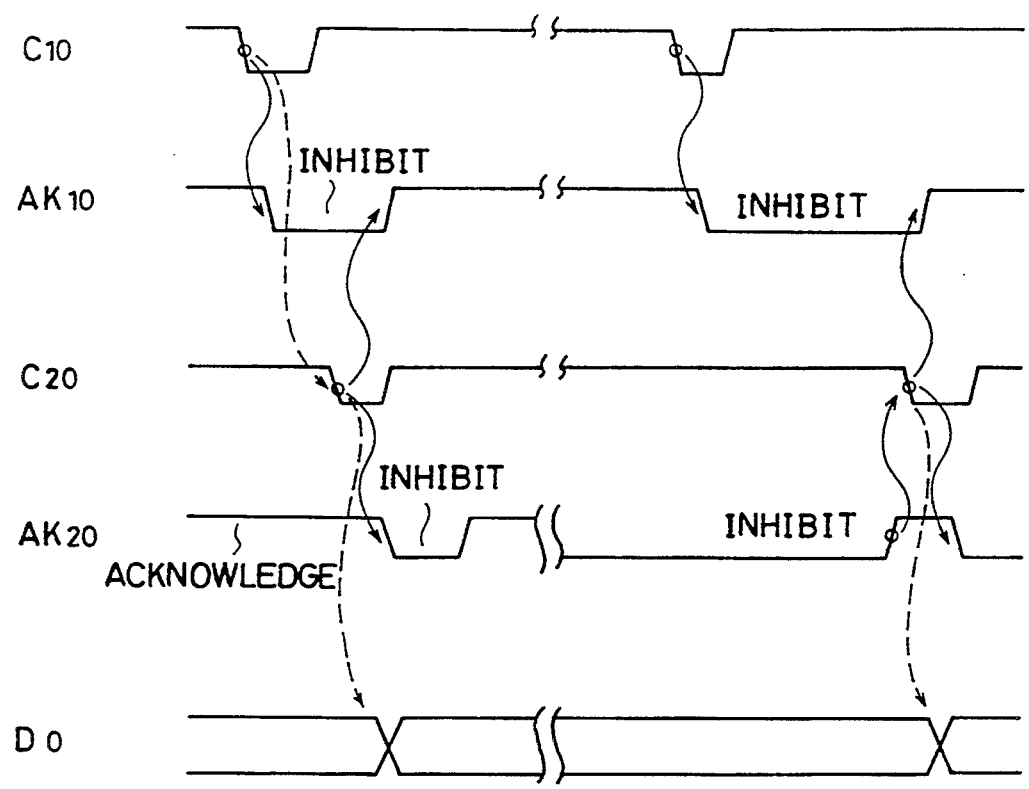
FIG. 6 is a timing chart explaining operation of a transfer control circuit.

FIG. 5 is a circuit diagram showing an arrangement of the transfer control circuit 12 and FIG. 6 is a timing chart explaining operation of the transfer control circuit 12.

As shown in FIG. 5, the transfer control circuit 12 comprises NAND gate G1, G2 and G5, inverters G3 and G4 and a buffer G6.

Operation will be described in a case where a data transmission path in a subsequent stage is empty.

When a data transmission path in a subsequent stage is empty, a "H" (logical high level) transmission acknowledging signal AK20 is applied from a transfer control circuit in the subsequent stage. When the transmission signal C10 applied from the preceding stage portion falls to "L" (logical low level), the output of the NAND gate G2 attains "H". As a result, the transmission acknowledging signal AK10 output from the inverter G4 attains "L" (inhibited state). The output of the NAND gate G5 attains "L" and the output of the inverter G3 attains "H". At this time, with the transmission acknowledging signal AK20 being "H", the output of the NAND gate G1 falls to "L". As a result, the transmission signal C20 falls to "L".

The data holding circuit 11 shown in FIG. 4 holds the input data DI and outputs the same as output data DO in response to the fall of the transmission signal C20.

The transfer control circuit in the subsequent stage receiving the transmission signal C20 brings the transmission acknowledging signal AK20 to "L" in response to the fall of the transmission signal C20.

Meanwhile, the output of the NAND gate G5 attains "H" and the output of the inverter G3 attains "L" in response to a fall of the output of the NAND gate G1 to "L". The output of the NAND gate G1 accordingly rises to "H" again. As a result, the transmission signal C20 rises to "H" again. As described above, the transmission signal C20 falls to "L" and after a lapse of a predetermined time period, it rises to "H".

The transmission signal C10 applied from the preceding stage portion rises to "H" after a lapse of a fixed time period. The output of the NAND gate G2 accordingly falls to "L" and the output of the inverter G4 rises to "H". As a result, the transmission acknowledging signal AK10 attains "H" (acknowledged state) again.

As described in the foregoing, when the transmission acknowledging signal AK20 applied from the transfer control circuit in the subsequent stage is "H" (acknowledged state), the transmission acknowledging signal AK10 to be applied to the preceding stage portion attains "L" (inhibited state) in response to a fall of the transmission signal C10 applied from the preceding stage portion, which is followed by the transmission signal C20 to be applied to the transfer control circuit in the subsequent stage after a lapse of a predetermined time period falling to "L".

Operation in a case where a data transmission path in a subsequent stage is busy will be described. In this case, the transmission acknowledging signal AK20 applied from the transfer control circuit in the subsequent stage is "L" (inhibited state). When the transmission signal C10 applied from the preceding stage portion falls to "L", the output of the NAND gate G2 attains "H" and the output of the inverter G4 falls to "L". As a result, the transmission acknowledging signal AK10 falls to "L". When the transmission acknowledging signal AK20 applied from the transfer control circuit in the subsequent stage is "L" (inhibited state), the output of the NAND gate G1 is "H". The transmission signal C20 to be applied to the transfer control circuit in the subsequent stage maintains "H" as long as the transmission acknowledging signal AK20 is "L". Therefore, no data is transferred form the data transmission path 10 to the data transmission path 20 (see FIG. 1).

When the transmission acknowledging signal AK20 applied from the transfer control circuit in the subsequent stage rises to "H" (acknowledged state), the output of the NAND gate G1 falls to "L". As a result, the transmission signal C20 to be applied to the transfer control circuit in the subsequent stage falls to "L". The data holding circuit 11 shown in FIG. 4 holds the input data DI and outputs the same as the output data DO in response to the fall of the transmission signal C20.

Meanwhile, the transfer control circuit in the subsequent stage brings the transmission acknowledging signal AK20 to "L" (inhibited state) after a lapse of a fixed time period in response to the fall of the transmission signal C20 applied from the transfer control circuit 12. The transmission acknowledging signal AK10 to be applied to the preceding stage portion rises to "H" (acknowledged state) after a lapse of a fixed time period in response to a rise of the transmission acknowledging signal AK20 applied from the transfer control circuit in the subsequent stage.

As described above, when the transmission acknowledging signal AK20 applied from the transfer control circuit in the subsequent stage is "L" (inhibited state), the transmission signal C20 to be applied to the transfer control circuit in the subsequent stage does not fall to "L". More specifically, when the data transmission path 20 in the subsequent stage is busy, data transmission from the data transmission path 10 to the data transmission path 20 is held over until the transmission acknowledging signal AK20 attains "H" (acknowledged state).

Figure 7:
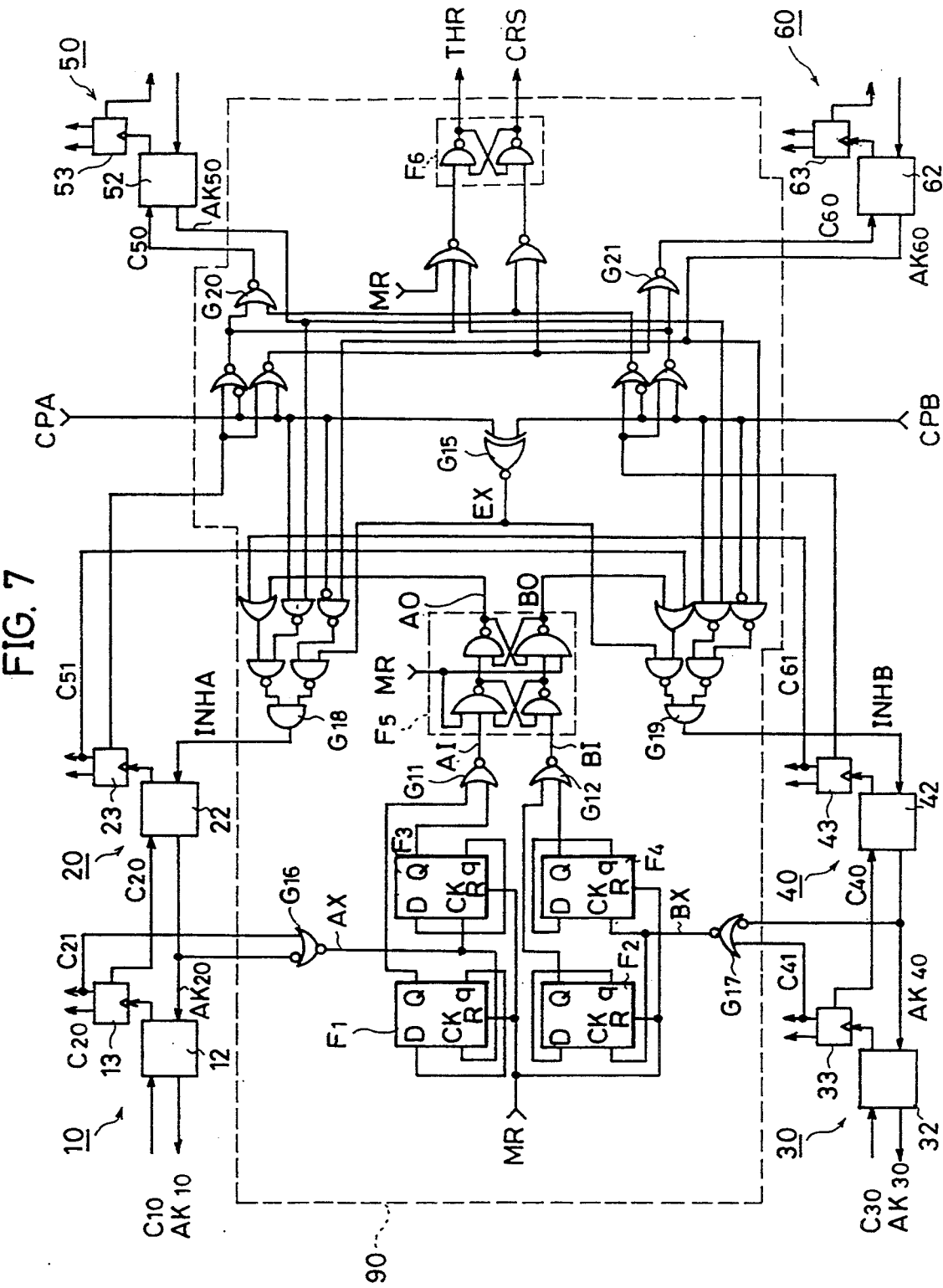
FIG. 7 is a circuit diagram showing an arrangement of an arbitration control portion.
Figure 8:
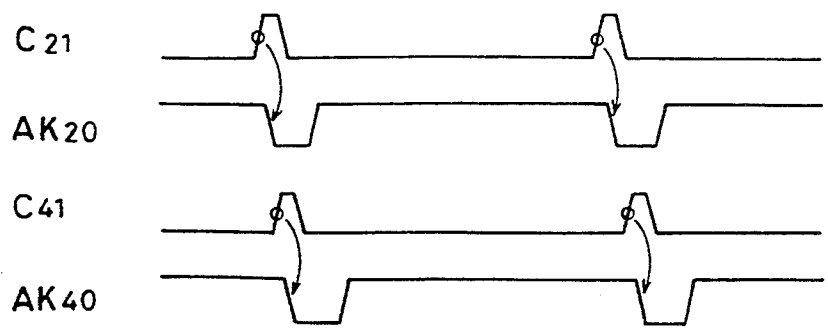
FIG. 8 is a timing chart explaining operation of the arbitration control portion.

FIG. 7 is a circuit diagram showing the detailed arrangement of the arbitration control portion 90.

Each of negative edge triggered D type flip-flops F1 and F2 and positive edge triggered D type flip-flops F3 and F4 has an input terminal D, a clock terminal CK, an output terminal Q, an inversion output terminal q and a reset terminal R. An output signal AK of an NOR gate G16 is applied to the clock terminals CK of the flip-flops F1 and F3 and an output signal BX of an NOR gate G17 is applied to the clock terminals CK of the flip-flops F2 and F4. The flip-flops F1–F4 and NOR gates G11 and G12 generate clock signals AI and BI for transferring one packet data including two words in block. A flip-flop F5 comprising four NAND gates generates state signals AO and BO for permitting the port receiving packet data first to transfer the data and inhibiting the other port from transferring data.

Each of the determination signals CPA and CPB applied from the branch destination determining portions 70 and 80 (see FIG. 1) attains "H" when the branch destination for packet data is the C port and attains "L" when the branch destination for the packet data is the D port. An exclusive NOR gate G15 outputs a signal indicating whether branching destinations for the packet data from the A port and the B port differ from each other or not. When the branch destinations of the packet data from both ports do not agree with each other, the signal EX acknowledges transfer of both of the packet data from the A port and the B port. AND gates G18 and G19 output inhibition signals INHA and INHB, respectively.

A flip-flop F6 comprising two NAND gates generates control signals THR and CRS for setting a state of the switching element 100. When the control signal THR is "H" and the control signal CRS is "L", the switching element 100 is set to "through state" and in the reverse case, the switching element 100 is set to "cross state".

Operation of the arbitration control portion 90 of FIG. 7 in the above-described cases (1)–(4) will be described with reference to FIGS. 8-12.

(a) Operation common to the cases (1)–(4) (see FIG. 8):

a signal AX having a pulse width larger than that of a transmission signal C20 is generated from a transmission signal C21 and a transmission acknowledging signal AK20 in order to ensure a margin for controlling arbitration by the arbitration control portion 90. Similarly, a signal BX having a pulse width larger than that of a transmission signal C40 is generated from a transmission signal C41 and a transmission acknowledging signal AK40. The transmission signal C21 is an inversion signal of the transmission signal C20 and the transmission signal C41 is an inversion signal of the transmission signal C40.

Signals AI and BI attaining "L" during the transfer period of the first and the second words are generated by frequency-dividing the signals AX and BX. When the signal AI falls to "L" prior to the signal BI, the signal AO attains "L". As a result, the transfer at the A port is acknowledged. Conversely, when the signal BI falls to "L" prior to the signal AI, the signal BO attains "L", thereby acknowledging transfer at the B port.

(b) Operation in the case (1) or (4) (see FIGS. 9 and 10):

Description will be made of a case wherein packet data from the A port arrives prior to the packet data from the B port.

Figure 9:
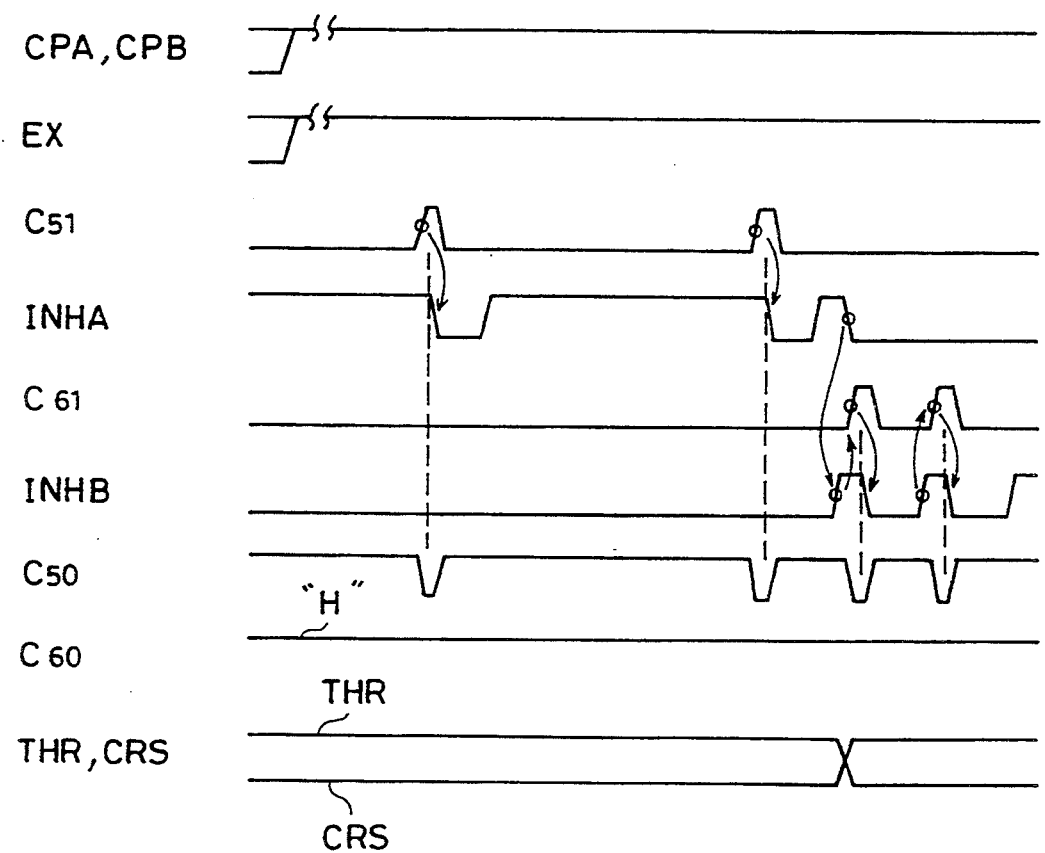
FIG. 9 is a timing chart explaining operation of the arbitration control portion.

In the case of (1), both of the determination signals CPA and CPB attain "H" (FIG. 9). As a result, the signal EX attains "H". This means that while packet data from one port is being transferred, the transfer of the packet data from the other port is inhibited.

When packet data from the A port is being transferred the inhibition signal INHB attains "L" (inhibited state) in response to the signal BO, a transmission signal C51 and the signal EX. As a result, packet data transfer from the B port is inhibited.

At this time, the control signal THR is at "H" and the control signal CRS is at "L". As a result, the switching element 100 is set to "through state". The first word and the second word of the packet data are successively transferred from the data transmission path 20 to the data transmission path 50 in response to two pulses of the transmission signal C51. Two pulses are generated in a transmission signal C50 in response to the two pulses of the transmission signal C51.

Thereafter, the inhibition signal INHA attains "L" (inhibited state) and the inhibition signal INHB attains "H" (acknowledged state). In addition, the control signal THR attains "L" and the control signal CRS attains "H". As a result, the switching element 100 is set to "cross state". Pulse generation in a transmission signal C61 is prevented until two pulses are generated in the transmission signal C51.

In response to the two pulses of the transmission signal C61, the first word and the second word of the packet data are successfully transferred from the data transmission path 40 to the data transmission path 50. In response to the two pulses of the transmission signal C61, two pulses are generated in the transmission signal C50.

Figure 10:
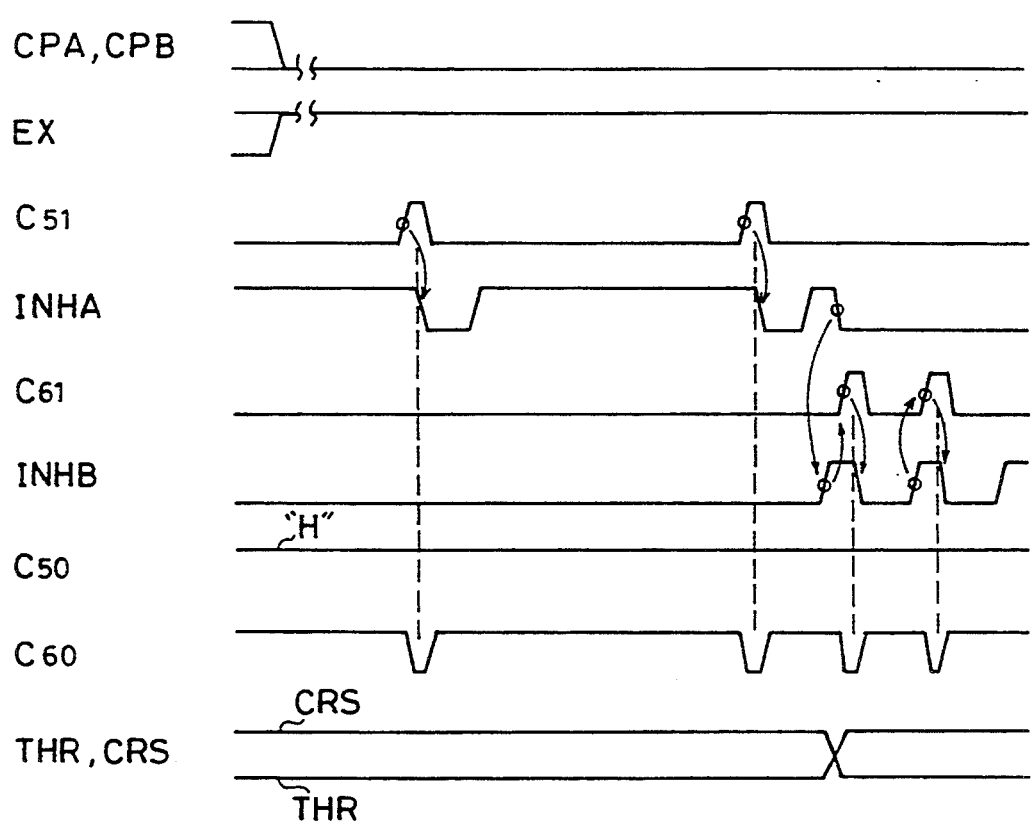
FIG. 10 is a timing chart explaining operation of the arbitration control portion.

In the case of (4), both of the determination signals CPA and CPB attain "L" (FIG. 10). The control signals THR and CRS attain levels opposite to that in the case of (1). Therefore, the switching element 100 is first set to "cross state" and thereafter it is switched to "through state".

Figure 11:
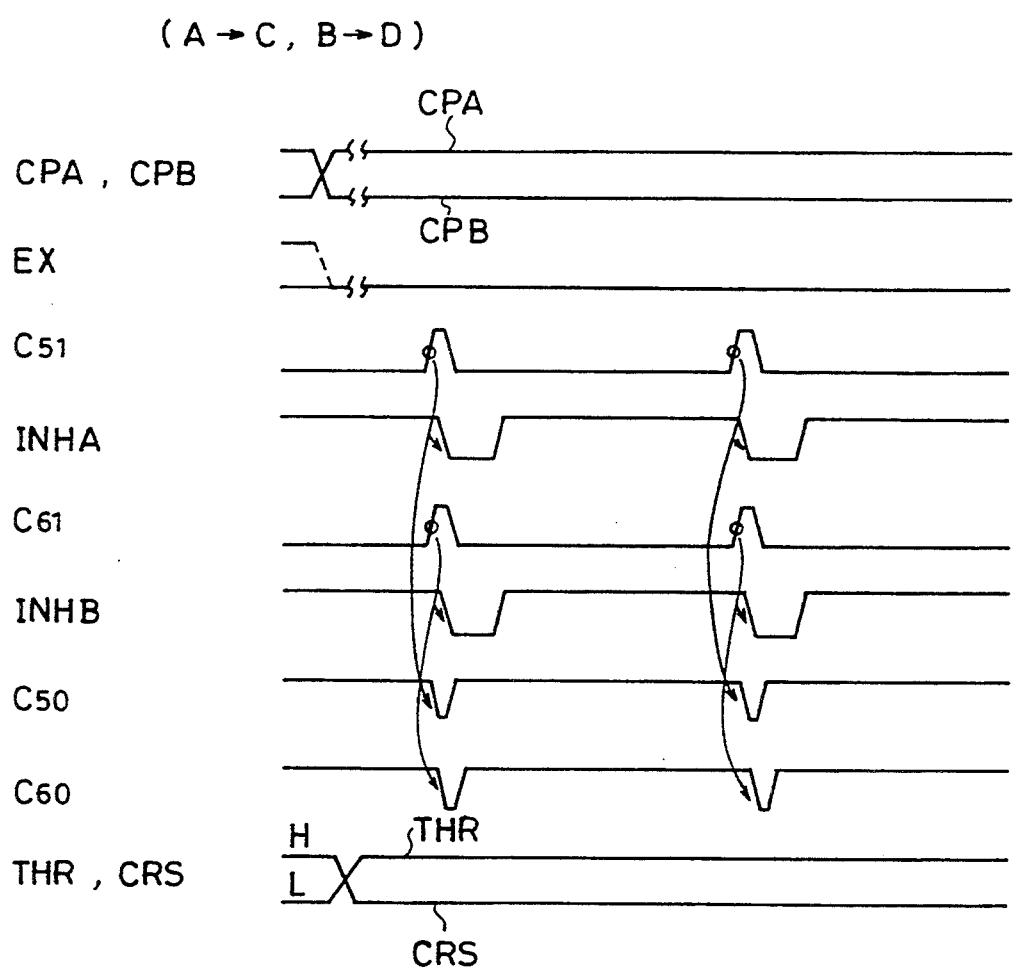
FIG. 11 is a timing chart explaining operation of the arbitration control portion.

(c) Operation in the case of (2) or (3) (see FIGS. 11 and 12):

In the case of (2), the determination signal CPA attains "H" and the determination signal CPB attains "L" (FIG. 11). As a result, the signal EX attains "L". This indicates that the packet data from the A port and the packet data from the B port can be transferred individually.

When no packet data exists in the data transmission paths 50 and 60 (the transmission acknowledging signals AK50 and AK60 are acknowledged), both of the inhibition signals INHA and INHB attain "H" (acknowledged state). As a result, transfer of both of the packet data from the A port and the B port is allowed. At this time, the control signal THR is "H" and the control signal CRS is "L". As a result, the switching element 100 is set to "through state".

In response to the two pulses of the transmission signal C51, the first word and the second word of the packet data are successively transferred from the data transmission path 20 to the data transmission path 50 and in response to the two pulses of the transmission signal C61, the first word and the second word of the packet data are successively transferred from the data transmission path 40 to the data transmission path 60.

Figure 12:
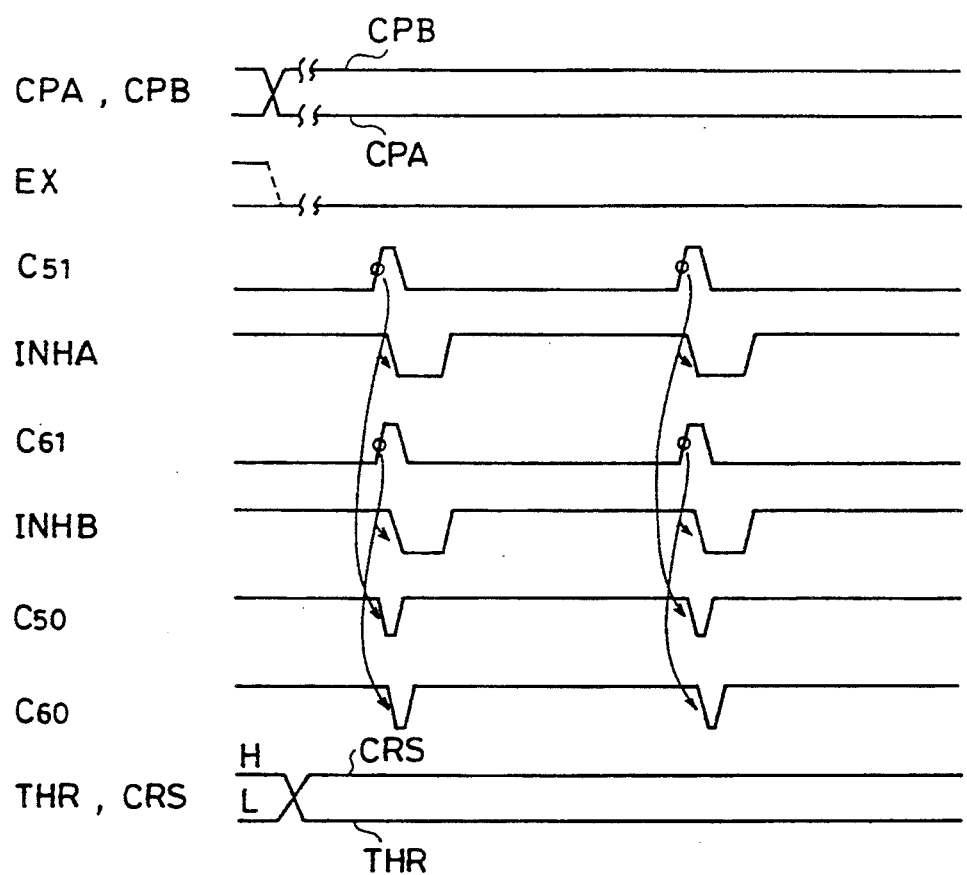
FIG. 12 is a timing chart explaining operation of the arbitration control portion.

In the case of (3), the determination signal CPA attains "L" and the determination signal CPB attains "H" (FIG. 12). As a result, the signal EX attains "L" also in this case. The control signals THR and CRS attain a level opposite to that in the case of (2). Therefore, the switching element 100 is set to "cross state".

Figure 13:
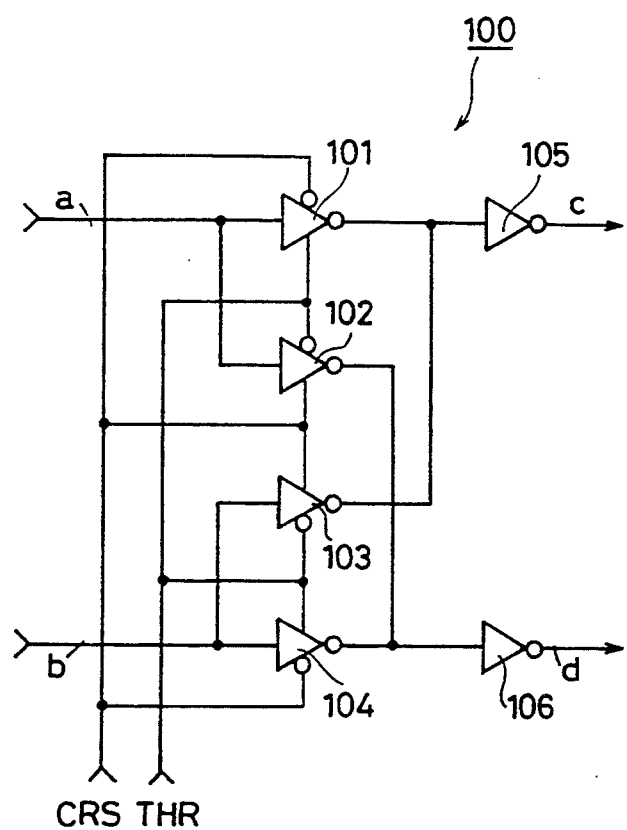
FIG. 13 is a circuit diagram showing an arrangement of a switching element.

FIG. 13 is a circuit diagram showing an arrangement of the switching element 100, indicating only the part corresponding to one bit.

The switching element 100 comprises four clocked inverters 101–104 and two inverters 105 and 106. An input terminal a is connected to the transmission path 20 and an input terminal b is connected to the data transmission path 40. An output terminal c is connected to the data transmission path 50 and an output terminal d is connected to the data transmission path 60.

When the control signal THR is "H" and the control signal CRS is "L" (through state), the clocked inverters 101 and 104 turn on and the clocked inverters 102 and 103 turn off. As a result, the data at the input terminal a is transferred to the output terminal c and the data at the input terminal b is transferred to the output terminal d.

Conversely, when the control signal THR is "L" and the control signal CRS is "H" (cross state), the clocked inverters 102 and 103 turn on and the clocked inverters 101 and 104 turn off. As a result, the data at the input terminal a is transferred to the output terminal d and the data at the input terminal b is transferred to the output terminal c.

As described above, branch destinations for the packet data input from the A port and the B port differ from each other, the packet data are simultaneously transferred from the respective ports in this embodiment. In addition, when the branch destinations of the packet data from the A port and the B port are the same, packet data are transferred in the order of arrival. It is therefore possible to control junction and merging without reducing a flow rate of input packet data when the branching destination varies. As a result, efficiency of the packet data junction and branching is improved.

Figure 14:
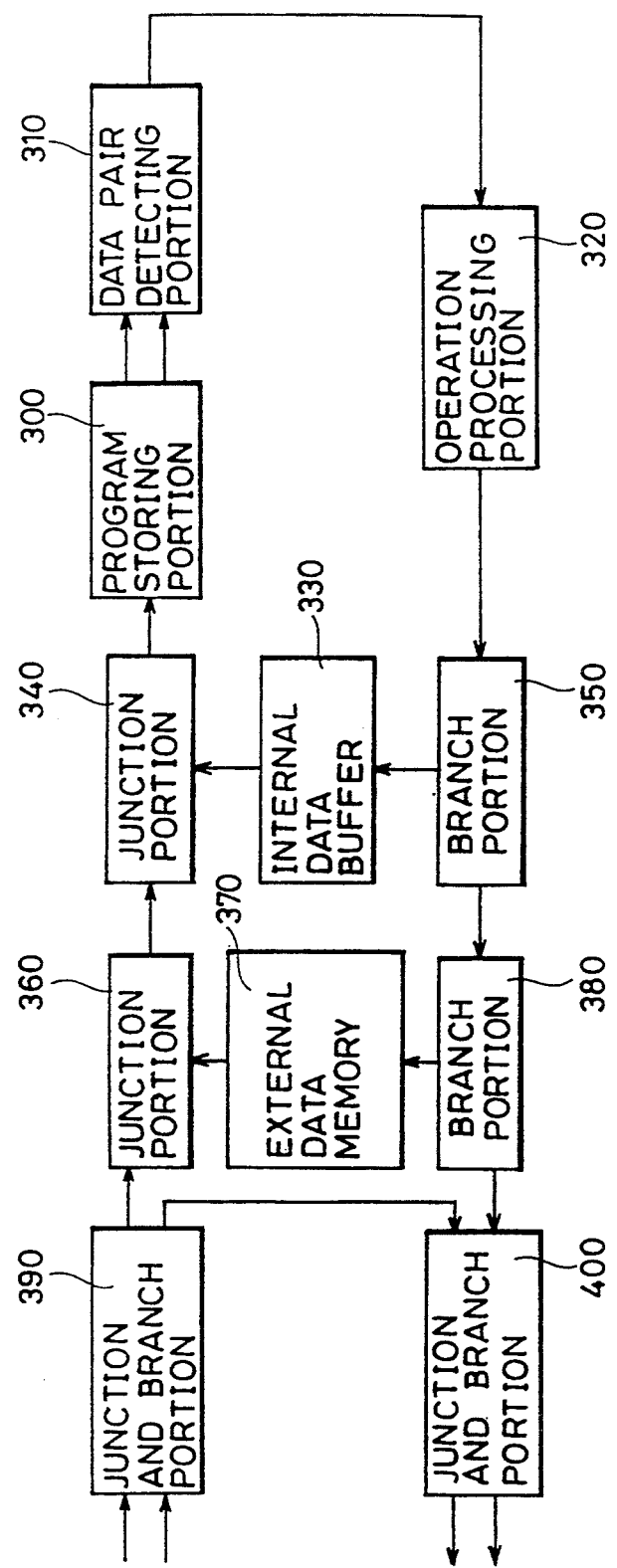
FIG. 14 is a block diagram showing an arrangement of a data flow type information processor to which the data transmission apparatus of the present embodiment is applied.
Figures 15, 16:
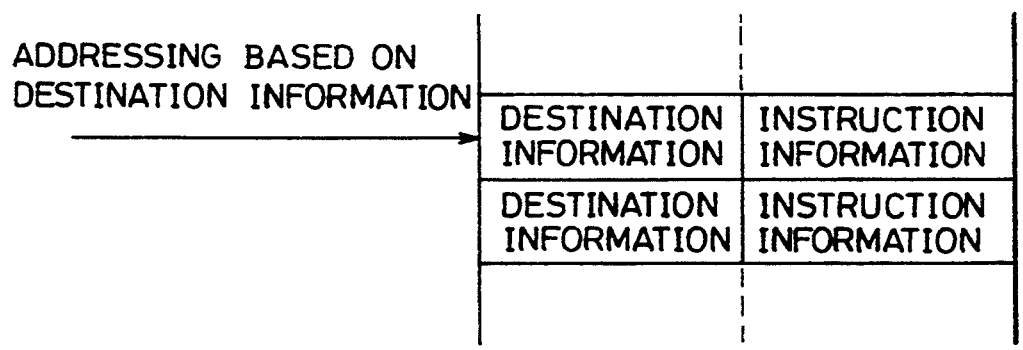
FIG. 15 is a diagram showing a field arrangement of a data packet to be processed in the data flow type information processor.
FIG. 16 is a diagram showing a data flow program stored in a program storing portion.
Figure 17:
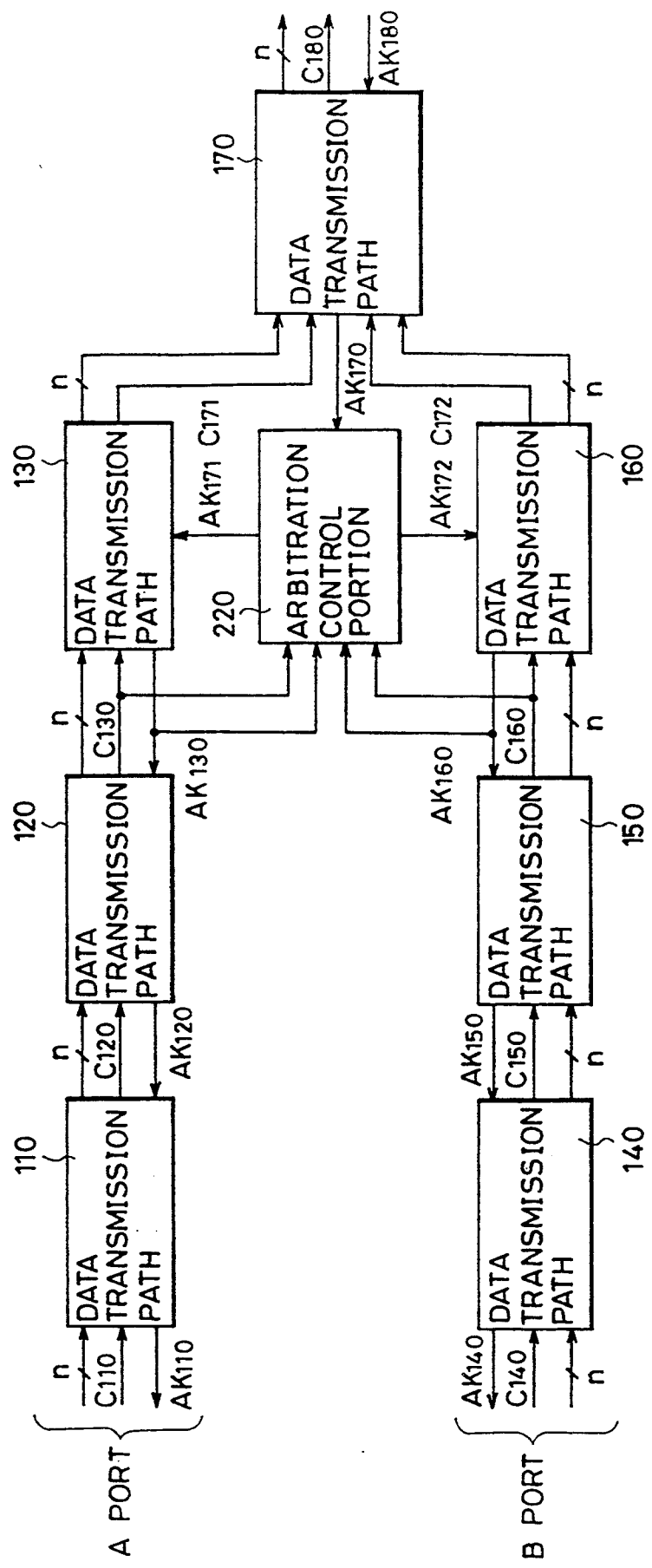
FIG. 17 is a block diagram showing an arrangement of a conventional data transmission apparatus to implement a junction mechanism.
Figure 18:
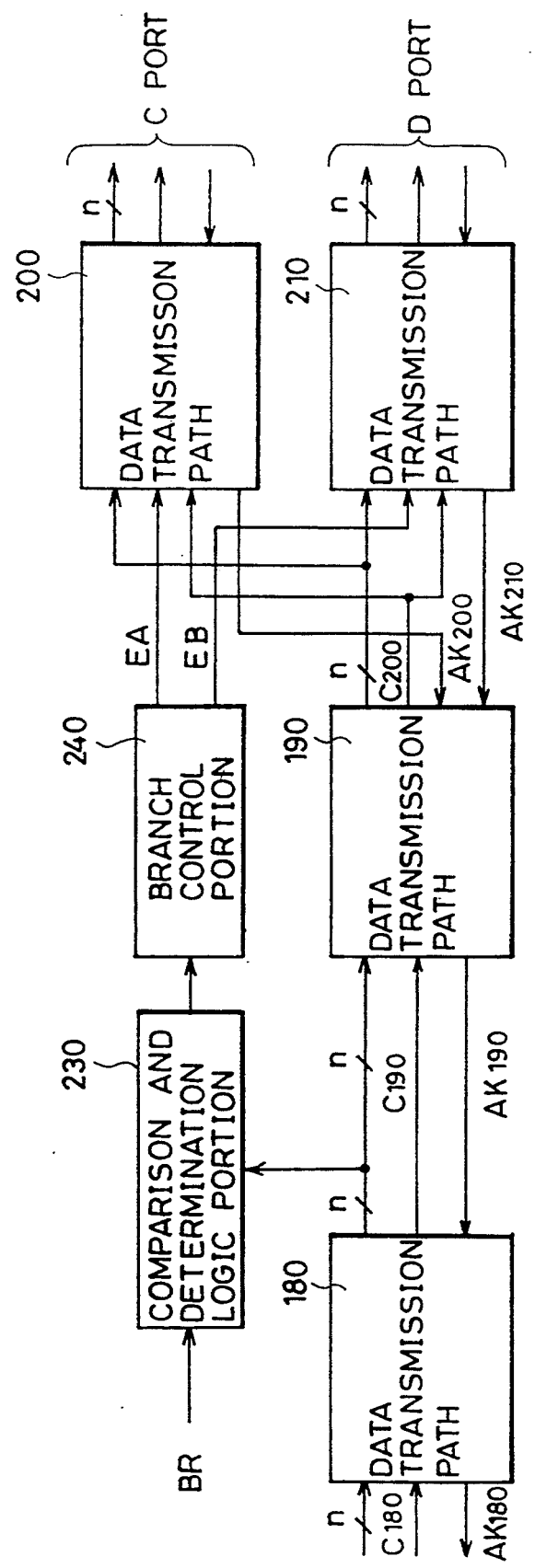
FIG. 18 is a block diagram showing an arrangement of a conventional data transmission apparatus to implement a branching mechanism.

The data transmission apparatus according to the present invention is applicable to a data flow type information processor, for example. FIG. 14 is a block diagram showing one example of an arrangement of a data flow type information processor. FIG. 15 is a diagram showing one example of a field arrangement of a data packet to be processed by the information processor.

The data packet shown in FIG. 15 includes a destination field, an instruction field, a data 1 field and a data 2 field. The destination field stores destination information, the instruction field stores instruction information and the data 1 field or the data 2 field stores operand data.

The destination field and the instruction field correspond to the first word D1 and the data 1 field and the data 2 field correspond to the second word D2 shown in FIG. 2. An m-bit identifier is included in the destination information.

In FIG. 14, a program storing portion 300 stores the data flow program shown in FIG. 16. Each row of the data flow program includes destination information and instruction information. The program storing portion 300 reads destination information and instruction information of the data flow program by addressing based on the destination information of input data packet as shown in FIG. 16, stores the destination information and the instruction information in the destination field and the instruction field in the data packet and outputs said data packet.

A data pair detecting portion 310 queues data packets output from the program storing portion 300. More specifically, when instruction information indicates 2 input instruction, the portion 310 detects two different data packets having the same destination information, stores operand data of one of the data packets (the contents of the data 1 field in FIG. 15) in the data 2 field of the other data packet and outputs said the other data packet. When the instruction information indicates 1 input instruction, the input data packet is output without modification.

An operation processing portion 320 carries out an operation processing with respect to the data packet output from the data detecting portion 310 based on the instruction information, stores the result thereof in the data 1 field of the data packet and outputs said data packet to a branch portion 350. The branch portion 350 applies the data packet to a junction portion 340 or a branch portion 380 through an internal data buffer 330. The junction portion 340 outputs the data packet from the internal data buffer 330 or the data packet from a junction portion 360 to the program storing portion 300 in the order of arrival.

As data packets continue to circulate through the program storing portion 300, the data pair detecting portion 310, the operation processing portion 320, the branch portion 350, the internal data buffer 330, the junction portion 340 and the program storing portion 300, an operation processing proceeds based on the data flow program stored in the program storing portion 300.

The junction and branch portions 390 and 400 are used for communication between the data flow type information processor and the outside. The data transmission apparatus according to the above-described embodiment can be used as the junction and branch portions 390 and 400.

The data transmission apparatus according to the present invention is not exclusively applied to a data flow type information processor but it can be widely applied to the other apparatuses requiring data transmission.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. Data transmission apparatus, comprising:
   a plurality of preceding stage portions and a plurality of succeeding stage portions;
   a plurality of data being transmitted from said plurality of preceding stage portions to any of said plurality of succeeding stage portions, each of said data further including an identifier for specifying a succeeding stage to which each said data is transmitted;
   controlled switching means coupled between said plurality of preceding stage portions and said plurality of succeeding stage portions for selectively transmitting each said data applied from said plurality of preceding stage portions to any of said plurality of succeeding stage portions;
   control means coupled to said controlled switching means for controlling said switching means in response to one of said identifiers specifying a succeeding stage portion destination included in each said data; and
   respective destination determining means for each of said plurality of preceding stage portions for generating a determination signal indicative of a destination of the respective data based on said identifier applied thereto from the respective preceding stage portion, said destination determining means being coupled to said control means,
   said control means controlling said controlled switching means such that each said data of at least two of said plurality of preceding stage portions are respectively transmitted simultaneously to at least two of said plurality of succeeding stage portions when said identifiers included in respective data applied from said at least two preceding stage portions specify mutually different succeeding stage portions of said at least two stage portions wherein said control means generates a control signal for controlling said switching means in response to said determination signal from the respective determining means.

2. The data transmission apparatus according to claim 1, wherein
   said plurality of preceding stage portions include first and second preceding stage portions,
   said plurality of succeeding stage portions include first and second succeeding stage portions,
   said control means generates a control signal indicative of a first or second state,
   said switching means includes:
      a first input terminal connected to said first preceding stage portion,
      a second input terminal connected to said second preceding stage portion,
      a first output terminal connected to said first succeeding stage portion,
      a second output terminal connected to said second succeeding stage portion,
      a first path connected between said first input terminal and said first output terminal and being rendered conductive in response to the first state of said control signal and non-conductive in response to the second state of said control signal,
      a second path connected between said first input terminal and said second output terminal and being rendered non-conductive in response to the first state of said control signal and conductive in response to the second state of said control signal,
      a third path connected between said second input terminal and said first output terminal and being rendered non-conductive in response to the first state of said control signal and conductive in response to the second state of said control signal, and
      a fourth path connected between said second input terminal and said second output terminal and being rendered conductive in response to the first state of said control signal and non-conductive in response to the second state of said control signal.

3. The data transmission apparatus according to claim 2, wherein said control means generates said control signal of said first stage when an identifier in the data from said first preceding stage portion specifies said first succeeding stage portion and an identifier in the data from said second preceding stage portion specifies said second succeeding stage portion, generates said control signal of said second state when an identifier in the data from said first preceding stage portion specifies said second succeeding stage portion and an identifier in the data from said second preceding stage portion specifies said first succeeding stage portion, and wherein said control means sets said control signal to one of said first and second states and then sets said control signal to the other of said first and second states in the order of data arrival when the respective identifiers in the data from said first and second preceding stage portions specify the same one stage portion of said first and second succeeding stage portion.

4. The data transmission apparatus according to claim 1, wherein each of said plurality of determining means includes comparing means for comparing said identifier with a predetermined destination signal and outputting the comparison result as said determination signal.

5. The data transmission apparatus according to claim 1, wherein said control means controls transmission of said plurality of data to a same succeeding stage portion in the order of respective arrival of said data when said identifiers included in said plurality of data applied from said plurality of preceding stage portions specify the same succeeding stage portion of said at least two stage portions.

6. The data transmission apparatus according to claim 5, wherein said control means further includes means for inhibiting transfer of subsequent data when identifiers in the data successively applied from said plurality of preceding stage portions specify mutually different succeeding stage portions.

7. The data transmission apparatus according to claim 1, wherein each of said data applied comprises at least two multi-bit words transmitted in a packet type block and said control means further includes means for maintaining control until said at least two words included in one data packet type block are transmitted.

8. The data transmission apparatus according to claim 1, wherein
each of said plurality of preceding stage portions includes data transmitting means for performing hand-shake type data transmission, and
each of said plurality of succeeding stage portions includes data transmitting means for performing hand-shake type data transmission.

9. A data flow information processor in which data, including an identifier for specifying a respective branch destination, is sequentially transmitted to a plurality of processing portions through at least one data transmission apparatus to perform an operation processing based on a data flow program, said data transmission apparatus comprising:
a plurality of preceding stage portions and a plurality of succeeding stage portions;
switching means coupled between said plurality of preceding stage portions and said plurality of succeeding stage portions for selectively transmitting each of the data applied from a plurality of preceding stage portions to any of said succeeding stage portions;
control means coupled to said switching means for controlling said switching means based on each said identifier specifying a succeeding stage portion destination for the respective data included in each data; and
respective destination determining means for each of said plurality of preceding stage portions for generating a determination signal indicative of a destination of the respective data based on said identifier applied thereto from the respective preceding stage portion, said destination determining means being coupled to said control means,
said control means controlling said switching means such that each said data of said plurality of preceding stage portions are simultaneously transmitted to succeeding stage portions of said plurality of succeeding stage portions through said switching means when respective said identifiers included in said data applied from said plurality of preceding stage portions specify mutually different succeeding stage portions and that each said data are transmitted in the order of arrival to at least one succeeding stage portion when respective said identifiers included in said data specify the same succeeding stage portion of said plurality of succeeding stage portions wherein said control means generates a control signal for controlling said switching means in response to said determination signal from the respective determining means.

* * * * *